United States Patent [19]

Krohn et al.

[11] 4,028,082
[45] June 7, 1977

[54] METHOD OF MAKING ARTIFICIAL INTRAOCULAR LENSES WITH HOLES

[75] Inventors: David A. Krohn, Southbridge; Bernard Grolman, Worcester, both of Mass.; Walter P. Siegmund, Woodstock, Conn.

[73] Assignee: American Optical Corporation, Southbridge, Mass.

[22] Filed: Feb. 10, 1976

[21] Appl. No.: 656,780

[52] U.S. Cl. .................... 65/23; 65/31; 65/61; 65/DIG. 7
[51] Int. Cl.² .............. C03C 19/08; C03C 15/00
[58] Field of Search ............ 65/31, 23, 61, DIG. 7; 3/13

[56] References Cited
UNITED STATES PATENTS

| | | | |
|---|---|---|---|
| 988,424 | 4/1911 | Woegerer | 65/23 |
| 2,619,438 | 11/1952 | Varian et al. | 65/61 X |
| 2,752,731 | 7/1956 | Altosaar | 65/23 |
| 2,825,184 | 3/1958 | Charlotte | 65/61 X |
| 3,244,776 | 4/1966 | Sheldon | 65/61 X |
| 3,275,428 | 9/1966 | Siegmund | 65/31 X |
| 3,925,825 | 12/1975 | Richards et al. | 3/13 |

*Primary Examiner*—S. Leon Bashore
*Assistant Examiner*—Frank W. Miga
*Attorney, Agent, or Firm*—H. R. Berkenstock, Jr.; William C. Nealon

[57] ABSTRACT

Making perforate optical sections (lenses) of pseudophakoi with avoidance of drilling operations and adversities thereof. Lens material is drawn with embedded acid soluble columns corresponding in diametral size and relative juxtaposition to the size and spaced locations of holes needed in a lens and the columns are etched away prior to or following final edging and surface finishing of the lens. Making multiple lens preforms is contemplated.

6 Claims, 14 Drawing Figures

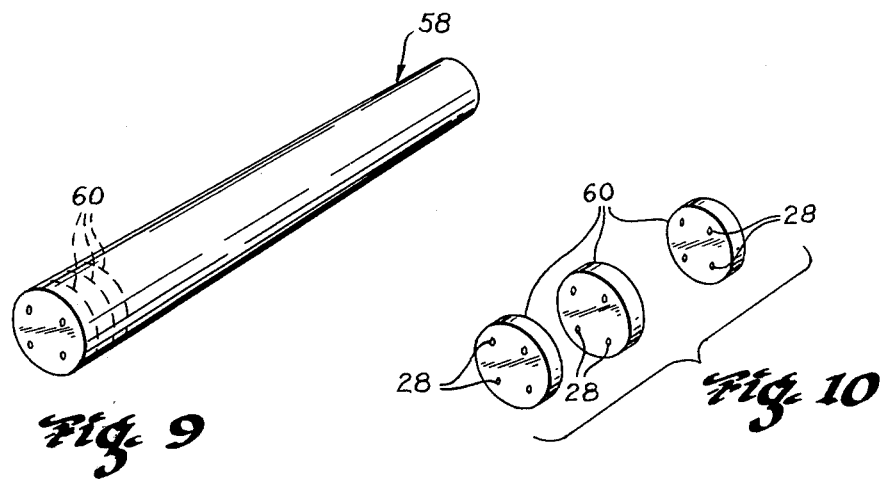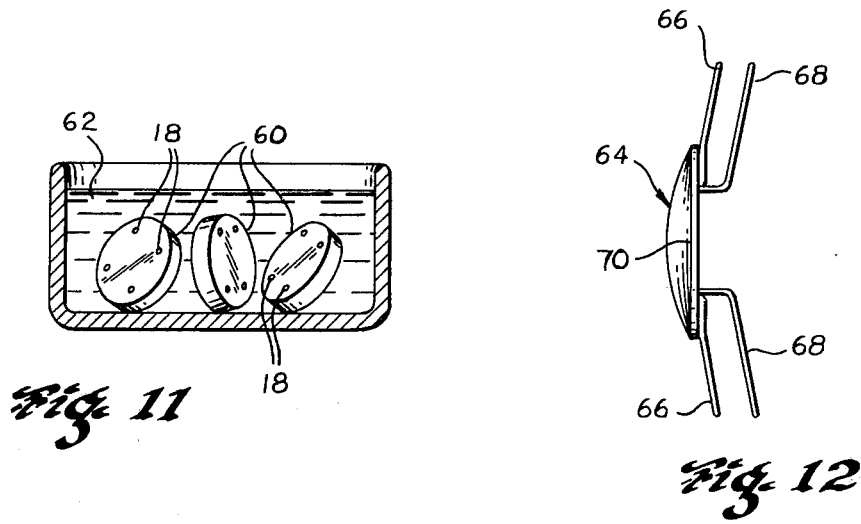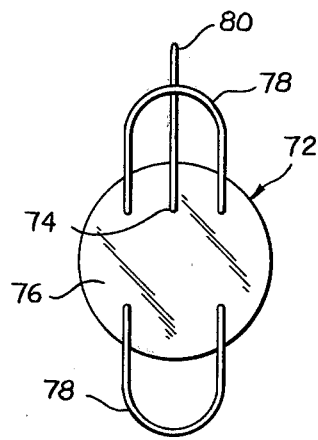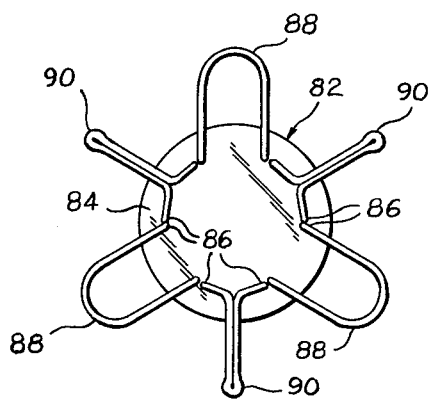

METHOD OF MAKING ARTIFICIAL INTRAOCULAR LENSES WITH HOLES

BACKGROUND OF THE INVENTION

1. Field of the Invention

This invention relates to improvements in method of manufacturing artificial intraocular lenses (pseudophakoi) and has particular reference to the manufacture of perforate optical sections (lenses) of pseudophakoi to which haptic sections (iris clips) may be fitted.

2. Discussion of the Prior Art

Well-fixed and well-centered intraocular lens implants are known to produce stable retinal images and offer the best chance of re-establishment of binocularity in cases of aphakia.

Many techniques of lens implantation, including suturing to the ciliary muscle as disclosed in U.S. Pat. No. 3,711,870 and iris diaphragm fixation as discussed in U.S. Pat. No. 3,673,616 for example, have been used. The latter is considered to be a safe procedure giving good stability and the present invention deals more particularly with improvements in this general type of pseudophakos but also has applicability to the former and/or any other type of pseudophakos requiring the provision of holes in its lens through which sutures may be extended or within which iris clips or other fastening wires may be inserted and anchored.

In cases of iris diaphragm fixation, "iridocapsular" and/or "iris clip" pseudophakoi are used. These implants are provided with a fastening section comprised of posterior and/or anterior iris clips usually in the form of loops or struts of wire or wire-like material, the ends of which are anchored in holes provided in the lens of the pseudophakos.

In view of a requirement for carefully controlled exceptionally close tolerances of hole size and the minuteness required of such holes, e.g. from 0.1 to 0.2 mm for lenses having a full diameter of only approximately 4 mm, the practice heretofore of forming such holes with drills has presented serious problems of tediousness, high scrap yield and excessive product cost, not to mention other adversities such as roughness or incipient cracking of lens material within the holes and/or chipping or flaking adjacent or at opposite ends of the holes, all of which tend to weaken the lens structure and render it subject to damage when wire iris clips and the like are anchored by interference fitting as is customary.

A principal object of the present invention is to provide pseudophakoi of improved construction and more particularly to provide a novel method for manufacturing perforate optical sections (lenses) of pseudophakoi in a manner which overcomes the aforementioned and related disadvantages of prior art techniques. Another object of the invention is to provide for the manufacture of perforate artificial intraocular lenses in an unusually simple, rapid and economical manner wherewith manufacturing output can be readily maximized at minimum product cost with improved end product quality and dependability of duplication in mass production.

SUMMARY OF THE INVENTION

The aforesaid objectives and their corollaries are accomplished by drawing a lens-forming material in which is embedded acid soluble columns corresponding in diametral size and relative juxtaposition to the size and spaced location of holes needed in a lens. The drawing of multiple lens preforms is contemplated from which individual lenses may be subsequently separated. For the multiple lens preforms from which the individual lenses may be cut, acid-soluble columns remaining in the lenses are removed, i.e. etched away, at a stage of the process either preceding or following final edge and surface finishing of the lenses. This removal of the acid-soluble columns, accordingly, leaves openings in their place which have walls of a surface texture substantially corresponding to the outer surface finish of columns used to form the same. Thus, the walls may be rendered free of incipient cracking, chipping, flaking or other roughness not uncommon to holes produced by prior art drilling operations.

Details of the invention will become more readily apparent from the following description when taken in conjunction with the accompanying drawings.

IN THE DRAWINGS

FIG. 1 is a greatly enlarged illustration, in partial cross-section, of an exemplary pseudophakos in situ;

FIG. 2. is a rear elevational view of the pseudophakos of FIG. 1;

FIG. 9 is an illustration of a preform after the drawing operation;

FIG. 10 is an illustration of lenses which may be produced from the preform of FIG. 9 by transaxial cutting thereof;

FIG. 11 is a view illustrating a leaching process used to form holes in the lenses according to the invention;

FIGS. 12, 13 and 14 illustrate examples of various modified forms of pseudophakoi to which the method of the present invention is applicable.

DESCRIPTION OF THE PREFERRED EMBODIMENTS

Figure 1:
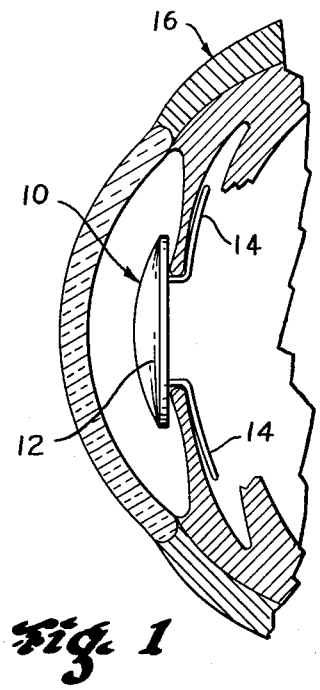
Figure 2:
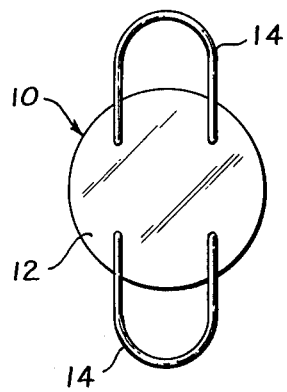

Referring more particularly to FIGS. 1 and 2 of the drawings, pseudophakos 10 comprises a lens 12 having a pair of posterior iris clips 14 for fixturing within the eye 16. This form of pseudophakos, which is shown for purposes of illustration only, is commonly referred to as an "iridocapsular lens" or "two-loop lens". Its fixation is in the iridocapsular cleft substantially as illustrated. Lens 12 is formed of a material which is biologically inert, i.e. not suceptible to being absorbed by body fluids and capable of being well tolerated by the human body when implanted. Glass is a good example of such a material. Exemplary base glasses are soda borosilicates and sodium titania silicates wherein all raw materials, particularly $SiO_2$ are selected to be types which are free of traces of radioactive substances. Desirable glass compositions are those which may be produced according to standard glass-making techniques with raw materials consisting of high purity silica, nitrates of sodium and barium, carbonates of sodium, strontium, calcium and manganese and oxides of titanium, zirconium, cerium, boron, zinc, iron and copper. It is, however, required for the sake of maintaining high purity that such glasses be made in glass makers platinum crucibles and with similarly noncontaminating stirrers. It is also highly desirable that the lens material have optical transmission properties simulating the optical absorption of the human crystalline lens and exemplary glass compositions of this type are set forth in a co-pending application for patent Ser. No. 615,276 which was filed on Sept. 22, 1975. Other ophthalmic lens glasses which are free toxicity and radioactivity and are preferably of low density may, of course, be used.

Iris clips 14 which comprise loops of wire having their opposite ends secured to lens 10 are, for reasons of avoiding irritation and/or human body rejections, formed of a biologically inert material such as platinum, titanium, tantalum or an extruded polyamide such as nylon or one or more of other resins including methylmethacrylate or biologically neutral chemically pure polymethylmethacrylates or biologically inert polymeric materials.

Iris clips 14 and others to be described hereinafter will be referred to as being "wire" or "formed of wire". Accordingly, it should be understood that the term "wire" as used in this specification and its appended claims is intended to include strands, strips, rods or fibers of biologically inert material whether the material is metallic or plastic and whether one or both is used to make up a particular array of iris clips or other lens-fastening components.

Iris clips such as 14 are conventionally fastened to lenses such as lens 10 by being force-fitted into holes provided in the lenses. To this end, each lens 10 usually requires the provision of holes 18 (FIG. 3) of predetermined carefully controlled diametral dimension and relative juxtaposition according to the locations desired for anchoring the ends of iris clips 14.

In avoiding prior art problems of having to form such holes by spotting and drilling each lens and further having to contend with the previously mentioned problems of roughness, flaking, chipping and/or incipient cracking inherent in lens drilling operations, the following procedure for producing holes 18 in lenses such as lens 10 is contemplated:

A relatively large preform of lens-forming glass and leachable columns is assembled with the columns located in such predetermined spaced juxtaposition as to represent the positions desired of holes to be produced in the lenses.

Figure 5:
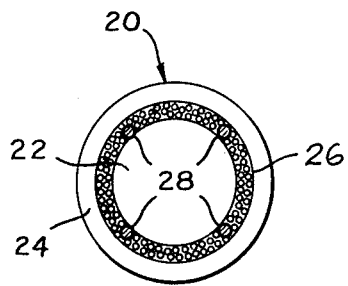
FIGS. 5, 6 and 7 illustrate various ways in which the lens-forming material and the acid-soluble columns may be assembled prior to drawing.

One such assembly is shown in FIG. 5 wherein preform 20 comprises a centrally disposed core or rod 22, an outer tubular sleeve 24 having an inner diametral dimension substantially greater than the diameter of rod 22, filler fibers or granules 26 and leachable columns 28.

Rod 22, sleeve 24 and fillers 26 are preferably all of identical composition, e.g. formed of one of the ophthalmic glass materials mentioned hereinabove and which will combine amorphously to form the unitary structure of the lens about columns 28 when the preform 20 is subsequently heated and drawn to a reduced cross-sectional size. Columns 28 are formed of a glass selectively leachable in hydrochloric acid, for example, and/or of other similarly leachable material such as aluminum which can be drawn at most glass drawing temperatures and leached, e.g. with sodium hydroxide.

Figure 6:
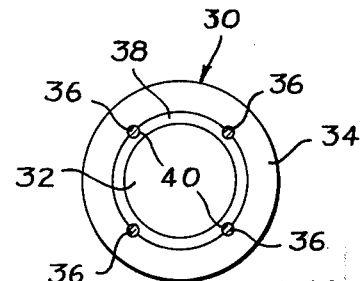

Another useful assembly is illustrated in FIG. 6 wherein preform 30 is made up of core 32, outer sleeve 34 and leachable columns 36 which are recessed or keyed into sleeve 34 so as to facilitate maintenance of their relative positioning during handling and working of preform 30. The space between sleeve 34 and core 32 may be filled with granules or fibers of lens-forming material similarly to the arrangement of FIG. 5 or comprise an intermediate sleeve 38 having peripheral recesses 40 so located as to receive portions of columns 36 which protrude from their positions in sleeve 34.

Figure 7:
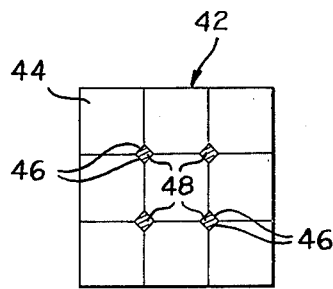

Still another useful assembly is preform 42, FIG. 7, which is comprised of a tight bundle of rectangular rods 44 of lens material each having one of its corners 46 flattened to the extent of forming rectangular interstitial channels in the bundle into which well-fitted leachable columns 48 are placed.

Figure 3:
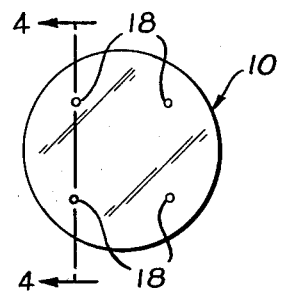
FIG. 3 is a rear elevational view of the ophthalmic section (lens) of the pseudophakos illustrating an exemplary number and position of holes which are provided therein for receiving and anchoring the haptic section (iris clips) of the pseudophakos.
Figure 4:
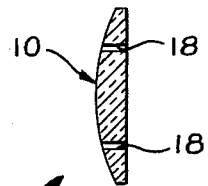
FIG. 4 is a cross-sectional view taken generally along line 4—4 of FIG. 3.

In all cases of preforms 20, 30, 42 and/or others similarly adaptable to principles of this invention, but not shown, the main and filler glasses (e.g. glasses of members 22, 24 and 26 in FIG. 5; 32, 34 and 38 in FIG. 6; and 44 in FIG. 7) are selected to be identical and of a type suitable for use as a lens body such as that of lens 10 of FIGS. 1, 2 and 3. Glasses useful for this purpose are set forth in the above-mentioned application for patent Ser. No. 615,276. Compatible leachable glasses and other materials of which columns 28 (FIG. 5), 36 (FIG. 6), 48 (FIG. 7) may be fabricated are set forth in U.S. Pat. Nos. 3,004,368; 3,624,816 and 3,899,314.

Referring more particularly to the forming of lenses from preform 20, for example, the assembly of all of its components is heated and drawn as a unit to such a reduced cross-sectional size that spacings between the drawn columns 28 correspond to the spacings desired between holes of finished lenses to be formed from the drawn preform.

Figure 8:
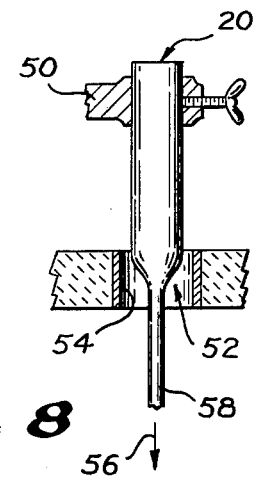
FIG. 8 is a diagrammatic illustration of apparatus for drawing assemblies of FIGS. 5, 6 and 7.

To this end, preform 20 may be clamped in a holder 50 (FIG. 8) and lowered gradually longitudinally through a heating zone 52 produced by a suitable electric or gas-fired heating ring 54. The thus progressively heated depending end of preform 20 is baited and drawn in the direction of arrow 56 into a boule 58 (FIGS. 8 and 9) of the cross-sectional size desired of lens blanks 60 which, in turn, may be cut therefrom.

It should be understood that while the aforesaid operation may be performed with heat of a temperature sufficient to permit drawing of the preform in zone 52, boule 60 may alternatively be formed by pressure rolling the preform at a lower temperature but one which is sufficient to fuse all glass components thereof into a unitary structure.

It should also be apparent that while boule 60 has been illustrated as being of circular cross-section, it can be rectangular, e.g. as would result from use of preform 42 of FIG. 7. The rectilinear boule may be cut and/or ground to a circular cross-sectional configuration before the slicing of lens blanks therefrom or not, as desired.

Blanks 60 cut from boule 58 to desired thicknesses are immersed in a suitable leaching medium 62 (FIG. 11) to selectively remove remaining portions of the drawn columns 28. This produces the desired holes 18 in each lens blank.

Holes 18 are of diametral sizes which correspond to those of leachable columns used and to the extent to which they are drawn and have wall surfaces of finished textures corresponding substantially to those initially provided upon the leachable columns.

Lens blanks 60 are finally ground and polished on opposite sides and about their edges to desired shapes and sizes.

While the foregoing has referred more particularly to the working of preform 20, other similar preforms including those of FIGS. 6 and 7 would be similarly worked, i.e. reduced in cross-sectional size, cut transaxially into lens blanks and leached to remove remaining materials of the original columns 36 or 48.

The foregoing sequence of steps may be altered, if desired. For example, final surface finishing and/or edge finishing of the lens blanks may be effected before the etching or leaching operation.

Completion of a pseudophakos such as 10 (FIG. 1) having a lens 12 with openings 18 formed according to the invention includes the fitting of wire iris clips 14 into the holes. By proper control of hole and wire sizes, an interference fit locking the two together can be accomplished.

Alternative forms of pseudophakoi to which the present invention is similarly applicable are shown in FIGS. 12, 13 and 14. In the arrangement of pseudophakos 64 of FIG. 12, anterior iris clips 66 are provided in addition to posterior iris clips 68. This is typical of well-known type of pseudophakos referred to in the art as a "two-loop lens" and it is implanted with the iris extended between anterior and posterior clips 66 and 68.

The embodiment of pseudophakos 72 (FIG. 13) is generally similar to pseudophakos 10 of FIGS. 1–3. In addition to the structure of lens 76 and the dual posterior iris clips 78, however, there is provided a fifth opening 74 produced according to the invention and into which one end of a wire clasp 80 is fastened. In use, pseudophakos 72 is implanted with clips 78 in the iridocapsular cleft and wire 80 is extended over the iris, through an iridectomy and around its adjacent clips 78.

Pseudophakos 82 of FIG. 14 has a lens 84 provided with openings 86 into which wires are extended. In the particular configuration illustrated, three posterior iris clips 88 are provided and three anterior wire struts 90 are formed.

Those skilled in the art will readily appreciate that there are various other modifications and adaptations of the precise forms of the invention here shown which may be made to suit particular requirements. Accordingly, the precise forms of the invention herein shown and described are not to be interpreted as restrictive of the invention beyond that necessitated by the following claims.

We claim:
1. The method of making a lens for a pseudophakos having spaced apart holes adjacent its edge, said method comprising the steps of:
   preparing a preform of pieces of lens material and parallel columns of leachable material by assembling in juxtaposition with said columns a number of said pieces of lens material, said columns and lens materials having compatible drawing temperatures and coefficients of thermal expansion and being so geometrically arranged in said preform as to space said columns apart from each other and away from the center of said preform according to relative positions desired of holes to be produced in said lens adjacent its edge;
   heating and drawing at least a portion of said preform to a reduced cross-sectional size in a directon parallel to the longitudinal direction of said columns to fuse said pieces of lens material and columns together as a unit;
   cutting from said drawn portion of said preform a cross-section of its length to form a lens blank;
   leaching away portions of said columns remaining in said lens blank to produce holes in their place; and
   at one stage of the process following said cutting step, grinding and polishing opposite sides and edges of said lens blank to the final thickness and curved surface configuration desired of said lens.

2. The method according to claim 1 wherein said selected columns are provided with a surface finish corresponding to that desired of inner walls of said holes to be produced by said etching.

3. The method according to claim 1 wherein said columns are leachable glass and said lens-forming material is glass.

4. The method according to claim 3 wherein said columns are leached away with hydrochloric acid.

5. The method according to claim 1 wherein said columns are aluminum and said lens material is glass.

6. The method according to claim 5 wherein said columns are leached away with sodium hydroxide.

* * * * *